Oct. 3, 1967     S. A. PATKAY     3,344,496

SELF-PROFILING CUTTER

Filed July 1, 1966

INVENTOR.
STEPHEN A. PATKAY
BY Lyon & Lyon
ATTORNEYS

# United States Patent Office 3,344,496
Patented Oct. 3, 1967

3,344,496
SELF-PROFILING CUTTER
Stephen A. Patkay, San Marino, Calif.
(572 E. Green St., Pasadena, Calif. 91101)
Filed July 1, 1966, Ser. No. 565,643
15 Claims. (Cl. 29—95)

This invention relates to self-profiling cutters; more particularly to cutters for lathes, milling machines, and other machine tools. In order to accomplish the most effective chip removal, one of the essential requirements is that the rake angle be mated to the particular material being machined, satisfying best suited chip removal conditions defined by its "plastic" properties. Furthermore, the rake angle should be defined between the surface of the tool engaged by the chip and a line tangent to a circular groove in the surface which differs in radius and location with respect to the cutting edge, depending upon the type of material being machined, as well as the rate of feed and the speed at which the cut is made.

The groove is spaced from the cutting edge due to the fact that a deposit, in a highly work-hardened condition, of the material being cut, builds up on the area between the groove and the cutting edge. This deposit builds up, then breaks away periodically and is carried away by the chip. Consequently, direct contact between the land between the groove and cutting edge and the chip occurs only during the very short intervals between the breaking away and the reforming of the built-up edge.

Continuous contact exists between the chip and the cutter only in the region of the groove. Heretofore, so as to create optimized conditions, it has been necessary, in order to perform repetitive machining operations, to grind or shape each cutter to a particular profile best suited for the work to be performed. As the character of the material to be machined is almost infinite in its variety, it is not practical and economical to tailor each cutter to its specific job. This is particularly true of carbide and ceramic cutters which must be preformed and thus, at best, only approximate the ideal profile.

The present invention seeks to solve the problem as outlined, and accordingly, included in the objects of this invention are:

First, to provide a self profiling cutter formed of two materials; namely, a material selected for its ability to cut the particular workpiece to be machined, and a material capable of being abraded by the chip produced by the workpiece being machined; the abradable material being located inwardly from the cutting edge and in the region which requires the presence of a groove so that the succession of chips from the workpiece causes a groove of optimum configuration to be formed in the abradable material.

Second, to provide a self-profiling cutter wherein the abradable material contains a lubricant to minimize frictional contact with the chips once the groove is formed.

Third, to provide a self-profiling cutter, wherein the abradable material has relatively high heat conductivity.

Fourth, to provide a self-profiling cutter which may be an expendable cutter formed of a sintered carbide or ceramic material, wherein the cutting edge is formed of a harder carbide or ceramic material and the abradable material formed of a softer carbide or ceramic material.

Fifth, to provide a self-profiling cutter wherein either or both the cutting material and the abradable material may be formed of non-sintered metal; such as high speed steel or "cast alloy."

Figure 1:
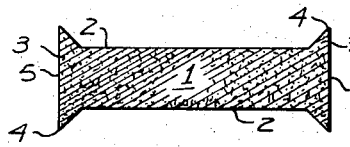
FIGURE 1 is a transverse sectional view, showing one form of the cutter body.
Figure 2:
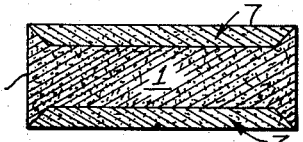
FIGURE 2 is a similar sectional view, showing a cutter body and abradable body assembled.
Figure 3:
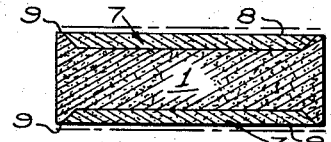
FIGURE 3 is a similar view, showing the completed cutter after the opposite sides have been finished.

The self-profiling cutter includes a cutter body 1, which is in the form of a flat disc, having recesses 2 on opposite sides, bordered by a marginal rim 3, which initially tapers to a sharp edge 4. The edges of the cutter body, between its two sides, form clearance walls 5.

Figure 10:
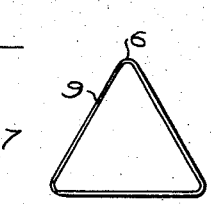
FIGURE 10 is a plan view, showing the self-profiling cutter constructed to provide three cutting sides.
Figure 11:
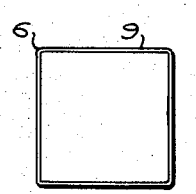
FIGURE 11 is a similar view, showing the cutter with four sides.
Figure 12:
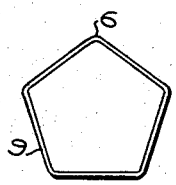
FIGURE 12 is a similar view, showing the cutter having five sides.
Figure 13:
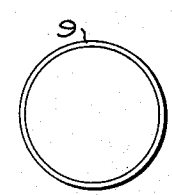
FIGURE 13 is a similar view, showing the cutter, circular in form.

In plan aspect, the cutter body may be triangular, as shown in FIGURE 10; square or rectangular, as shown in FIGURE 11; five-sided, as shown in FIGURE 12; or circular, as shown in FIGURE 13. The cutter body may also take other shapes to meet various special applications. In each instance, the corners have a slight radius, as indicated by 6.

The two recesses 2 receive abradable bodies 7, bonded to the cutter bodies. After assembly of the cutter body and abradable bodies, the opposite sides are lapped or otherwise provided with a smooth, finished surface 8, around the margins of which is exposed a rake land 9.

The material comprising the cutter body may vary substantially, depending upon the work it is to perform. In most instances, the cutter body is formed of sintered single or double carbides; for instance, tungsten carbide or a double carbide of tungsten and titanium, or tantalum. The cutter body may also be formed of various well known metal-ceramic or ceramic materials. The essential requirement is that the cutter body be capable of withstanding the loads and abrasive force, while maintaining a cutting edge without the premature formation of a wear land at the clearance edge.

The abradable body 7 is formed of a material less capable of withstanding abrasion. The properties of the abradable body are related to the properties of the cutter body; but in any case, the abradable body is less hard and less wear resistant than the cutter body.

By reason of the fact that there is an almost infinite variety of materials intended to be machined, and in addition a wide variety of machining operations, and still further, by reason of the fact that there is a wide variety of materials suitable for the construction of machine tool cutters, the selection of materials which may comprise the cutter body and the abradable body is extremely large. Thus, by the way of example but not intended as a limitation, the cutter body may be formed of tungsten carbide, Grade C2 or C3, having a hardness of 92 to 96 on the Rockwell "C" scale. The abradable body should be less hard.

Another example, the cutter body may be formed of a double carbide of tungsten and titanium or tantalum, having a grade of C6 with a usual hardness of 94 Rc. In this case, the abradable body may be a carbide of the C4 grade.

The material comprising the cutter body is not limited to sintered carbide or to sintered metal-ceramic materials, or to ceramic materials, but may be formed of cast alloys, such as "Tantung." The abradable body, or the softer body, may be a hard bronze, such as beryllium copper or aluminum bronze.

Still further, the cutter body may be formed of any of the various steel alloys used in the construction of tool bits, in which case, the abradable body is formed of a softer ferrous or non-ferrous alloy.

In addition to being softer than the cutter body, the abradable body may include or comprise materials having lubrication qualities, such as molybdenum, copper alloy, or even tin, antimony, or lead. Still further, the abradable body may comprise or contain materials having good heat conductivity, for example, copper alloys.

Figure 4:
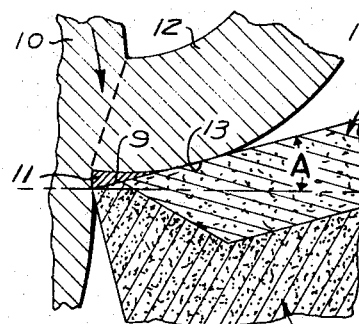
FIGURE 4 is an enlarged fragmentary sectional view, showing the self-profiling cutter as it first appears when in engagement with a workpiece.
Figure 5:
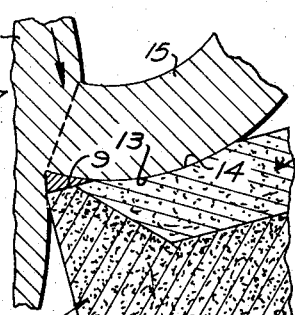
FIGURE 5 is a similar view, showing the chip groove partially formed.

Operation of the self-profiling cutter is as follows, reference being made particularly to FIGURES 4, 5, 6, and 7:

For many applications, the rake land 9 and the clearance edge wall 5 define a ninety degree angle and the cutter is presented to the workpiece 10 so as to provide a negative rake angle A as indicated in FIGURE 4. Under these conditions, there is formed almost immediately on contact with the workpiece, an initial cap or built-up edge 11. The upper surface of the initial cap defines a circle which is essentially tangent to the upper surface of the abradable body 7. This initial condition is not the ideal condition for the machining operation, thus, initially a highly thickened, rather poor chip 12 is formed which bears heavily against the abradable body 7. As a result, a groove 13 begins to form, as shown in FIGURE 5. As the groove 13 is formed, the profile of cap changes to an intermediate profile, as indicated by 14, its upper surface corresponding to the curvature of the groove 13. By reason of the change in curvature, the chip 15, thus formed, differs from the chip 12, and more closely approaches the ideal form which is then the result of a decreased degree of internal deformation. However, the excessive pressure on the abradable body 7 continues.

Finally, a groove 16 is formed, a corresponding built-up cap 17 is formed, chip thickening being reduced to its practical minimum. The internal forces of the final chip 18 become equalized so that the abrasive force, exerted by the chip, is minimized and any further abrasion of the body 7 takes place slowly.

Figure 6:
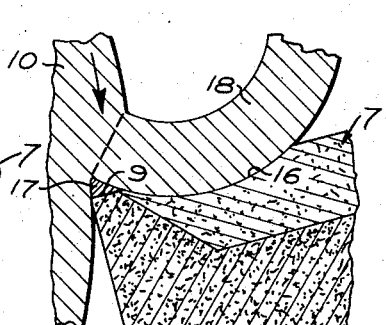
FIGURE 6 is a similar view, showing a fully formed chip groove.

It should be noted that the caps 11, 14, and 17, shown in FIGURES 4, 5, and 6, are not permanent, but form and reform rapidly. Nevertheless, they protect the rake land 9 and the adjacent edge of the abradable body 7.

It should also be noted that the dimensions, shape, and form of the cap, as well as the dimensions, shape, and form of the chip varies with the feed of the cutter, the speed of the workpiece, and the material comprising the workpiece. Thus, in order that the most optimum groove be formed, the particular cutting region of the tool should be used throughout its life, on the same type of material, and at a constant speed and feed or nearly so.

Figure 7:
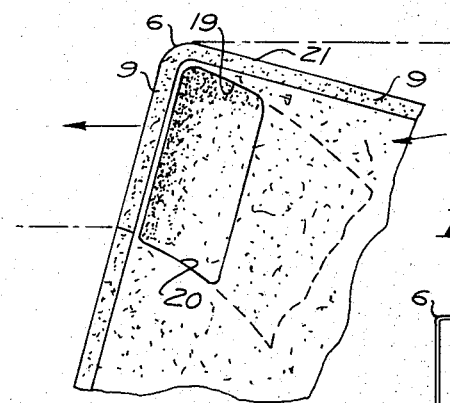
FIGURE 7 is an enlarged fragmentary top view of the self-profiling cutter, and illustrating a fully formed chip groove in its upper surface.

It will be noted that, as shown in FIGURE 7, the chip indicated by broken lines, curves away from the workpiece, also indicated by broken lines, so that the groove is formed with a curved inner edge 19 and curved outer edge 20, and that the inner edge 19 does not intersect the adjacent edge wall 21.

The construction of the self-profiling cutter may vary, depending upon the material being used. For example, the cutter body 1 may be pressed in the form shown in FIGURE 1 and then sintered or partially sintered. The material comprising the body 7 may then be pressed into the recesses 2 while in powder form, and then the cutter body and abradable body may be resintered. This is particularly feasible if the sintering temperature of the abradable body 7 is less than the sintered temperature of the cutter body 1. Alternatively, the abradable body or bodies may be formed and sintered independently of the cutter body, and then the two bodies may be bonded by a fusable material such as cobalt, or brazed at high temperature.

If the abradable body 7 is not formed of a sinterable material, but instead is formed of a metal or metal alloy, it may be precast and cemented and brazed in place.

Figure 8:
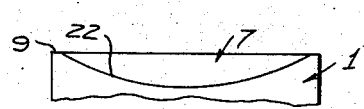
FIGURE 8 is a fragmentary sectional view similar to FIGURE 3, showing a modified form of the cutter body and abradable body.

Reference is directed to FIGURE 8. In this construction, a curved interface 22 is provided between the cutter body 1 and the abradable body 7.

Figure 9:
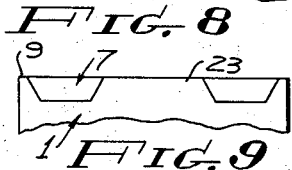
FIGURE 9 is another fragmentary sectional view similar to FIGURE 3, showing another form of the cutter body and the abradable body.

Reference is directed to FIGURE 9. In this construction, a central land 23 is provided.

Figure 14:
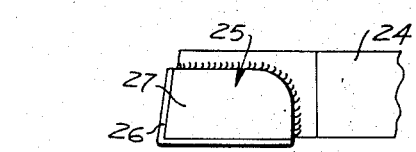
FIGURE 14 is a fragmentary top view, of a bit shank, in which the cutter is in the form of an insert bonded to the bit shank.

Reference is now directed to FIGURE 14. In this construction, a metal bit shank 24 is provided and the self-profiling cutter is in the form of an insert 25, suitably cemented or bonded to the shank 24. In this case, a rake land 26 is provided on two edges and the abradable body 27 is filled in behind the rake land. A tool constructed, in accordance with FIGURE 14, would in most cases not be presented to the workpiece so as to define a negative rake angle. Instead, the angle between the land 26 and the adjacent clearance edge wall would be less than ninety degrees.

Figure 15:
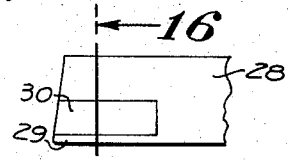
FIGURE 15 is a plan view of another bit shank, which also forms the cutter body, and showing an abradable body set therein.
Figure 16:
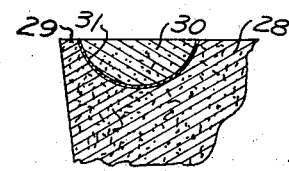
FIGURE 16 is an enlarged fragmentary sectional view, taken through 16—16 of FIGURE 15.

Reference is directed to FIGURES 15 and 16. In this construction, the bit shank 28 is formed of tool steel and therefore corresponds to the cutter body 1. A rake land 29 is formed along one margin and a recess is formed behind the rake land. The recess receives an abradable body 30, corresponding to the abradable body 7, which is suitably secured to the bit shank by bonding material 31. Inasmuch as the bit shank 28 is formed of tool steel, the abradable body 30 is formed of a softer material which may be steel, but is preferably a non-ferrous alloy, preferably a copper-bearing alloy.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:
1. A self-profiling cutter, comprising:
 (a) a cutter body having a cutting edge for engaging a workpiece, a rake land bordering said cutter edge for deflecting chips as they are cut from said workpiece, and a recess bordering said rake land and occupying a region in the path of said chip when cut by said cutting edge;
 (b) and an abradable body filling said recess and bonded to said cutter body, said abradable body having less strength than said cutter body and adapted to be abraded by chips to form a chip guiding groove of best suited self-created profile, with a "best suited" rake angle for the specific material which is being cut.

2. A self-profiling cutter as set forth in claim 1, wherein:
 (a) said rake line is less in width than the cap formed thereon by said chips whereby the initial point of contact by said chips is in the region covered by said abradable body.

3. A self-profiling cutter as set forth in claim 1, wherein:

(a) said cutter body and said abradable body are formed of sintered material, the abradable body having less hardness and wear resistance than said cutter body:

4. A self-profiling cutter as set forth in claim 1, wherein:

(a) said abradable body contains a lubricant for minimizing friction between said chips and said abradable body.

5. A self-profiling cutter as set forth in claim 1, wherein:

(a) said abradable body is formed of an alloy, containing a metal having lubricating properties.

6. A self-profiling cutter as set forth in claim 1, wherein:

(a) said bodies are formed of a non-sintered metal alloy.

7. A self-profiling cutter as set forth in claim 1, wherein:

(a) said cutter body has a continuous cutting edge and a continuous rake land forming a peripheral rim and said recess is continuous within said peripheral rim;

(b) and said abradable body is likewise continuous, whereby said cutter body may be set in a plurality of cutting positions.

8. A self-profiling cutter as set forth in claim 1, wherein:

(a) said cutter body is an insert bonded to a tool bit shank and presents at least two angularly related cutting edges, and said rake lands as well as said abrasive body are disposed inwardly of both cutting edges.

9. A self-profiling cutter as set forth in claim 1, wherein:

(a) said cutter body is an integral part of a tool shank and said rake land and the abradable body extends along one side thereof.

10. A self-profiling cutter for a workpiece which tends to produce a series of chips of curved contour and a periodicaly shedable cap when engaged by a cutter, the size of the cap being dependent on the speed with which the workpiece moves past a cutter and the feed of the cutter into the workpiece, said self profiling cutter comprising;

(a) a cutting edge;

(b) a rake land of less width than said cap at a selected speed and feed;

(c) and a chip engaged region bordering said rake land;

(d) said cutting edge and rake land being formed of harder and more wear resistant material than the material within said chip engaged region, whereby the material in said region is worn away by a continuous chipflow to define a groove corresponding to the naturally occuring curvature of said chip.

11. A self-profiling cutter according to claim 10, wherein:

(a) at least said cutting edge and said rake land are formed of sintered material.

12. A self-profiling cutter according to claim 10, wherein:

(a) the material comprising said chip engaged region includes a solid lubricant.

13. A self-profiling cutter according to claim 10, wherein:

(a) the material comprising said chip engaged region has higher heat conductive properties than the material comprising said cutting edge and rake land.

14. A self-profiling cutter according to claim 10, wherein:

(a) said cutting edge, rake land, and chip engaged region are continuous to permit said cutter to be indexed thereby to present different portions to said workpiece.

15. A self-profiling cutter according to claim 10, wherein:

(a) at least a pair of angularly related cutting edges and rake lands are provided.

No references cited.

HARRISON L. HINSON, *Primary Examiner.*